United States Patent [19]
Wilson et al.

[11] 3,738,445
[45] June 12, 1973

[54] SEISMOMETER SPRING SUSPENSION SYSTEM

[76] Inventors: Ernest Wilson, 10031 Larston, Houston, Tex. 77055; Allen H. Mueller, 304 W. 31st St., Houston, Tex. 77018

[22] Filed: Sept. 7, 1971

[21] Appl. No.: 178,030

[52] U.S. Cl. ........ 181/0.5 R, 181/0.5 AP, 267/160, 73/71.1, 340/17
[51] Int. Cl. ........................................... G01v 13/00
[58] Field of Search .................... 267/160; 73/71.1, 73/71.2, 70, 71.4; 181/0.5 AG, 0.5 P, 0.5 NP, 0.5 T; 340/15, 17; 310/27

[56] References Cited
UNITED STATES PATENTS

| | | | |
|---|---|---|---|
| 3,239,804 | 3/1966 | Elskamp | 267/161 |
| 3,582,875 | 6/1971 | Wambeck | 340/17 |
| 3,344,397 | 9/1967 | Elliott | 267/160 |

*Primary Examiner*—Benjamin A. Borchelt
*Assistant Examiner*—J. V. Doramus
*Attorney*—James F. Weiler, Jefferson D. Giller, William A. Stout et al.

[57] ABSTRACT

A spring suspension system for a seismometer for suspending one body relative to the second body including three resilient leaf cantilever springs each including two adjacently positioned leaf arc segments extending approximately 120° with the second ends of adjacent segments connected together and the first ends of adjacent segments being connected respectively to the first and second bodies. An inner ring connected to the inner segments and an outer ring connected to the outer segments with the inner and outer rings including portions electrically insulated from each other to provide two separate electrical conducting paths. A spiral electrical conducting spring connected to each separate electrical path, one end of which is fixed and the second end limiting rotational movement of the leaf spring.

9 Claims, 14 Drawing Figures

ERNEST WILSON
ALLEN H. MUELLER, INVENTORS

PATENTED JUN 12 1973 3,738,445

ERNEST WILSON
ALLEN H. MUELLER, INVENTORS

ERNEST WILSON
ALLEN H. MUELLER, INVENTORS

PATENTED JUN 12 1973

ERNEST WILSON
ALLEN H. MUELLER, INVENTORS

ERNEST WILSON
ALLEN H. MUELLER, INVENTORS

SEISMOMETER SPRING SUSPENSION SYSTEM

BACKGROUND OF THE INVENTION

Seismometers of the type typically used in geophysical land reflection exploration generally consists of (1) a spring suspended mass in a (2) supporting frame and (3) means to measure the relative motion between the mass and the frame. Such seismometers commonly employ flat leaf springs to suspend the mass. The conventional spring is generally a uniform tri-flexure spring with the flexures having a single arc like form subtending approximately 120° and being circularly arranged with the ends joined to an inner and outer support ring.

The intrinsic linear range of a seismometer spring must be greater as its diameter becomes smaller, or as the natural frequency of the spring-mass system becomes lower. Since land type seismometers have tended toward small size and low frequency, the conventional seismometer spring has become marginal in performance under these conditions. Furthermore, prior leaf springs tend to generate an internal torsional force which generates distortion in the output signal. Furthermore, the leaf springs of the prior art seismometers were often permanently deformed by externally applied torsional forces.

Generally, the suspended mass is an electrical coil and the methods of electrically interconnecting the coil to external terminals have created additional problems in connection with the spring. Generally, two methods of electrically connecting the coil have been used. First, two separate flexible electrical conductors, known as pigtails, have been used in the past to directly bridge from the coil to the external electrical terminals. The pigtails are attached only by their ends and are otherwise self-supporting. Because of their nature, the angular position of the coil assembly must be fixed relative to the frame thus requiring the springs supporting the coil to be fixed to the frame. With the pigtail type electrical connections, any rotational accelerations applied external to the seismometer generate a torsional force between the frame and the suspended mass of the coil which must be supported by the spring and large rotational accelerations often permanently deform the springs of seismometers.

In order to avoid the use of pigtails, a second method of electrical interconnect utilizing slip rings has been in common use. In this method, the springs form part of the sliding contacts which allow rotation of the coil relative to the frame thereby protecting the springs from rotational accelerations. However, slip rings have certain disadvantages in that they require precious metal plating in order to overcome the problem of surface oxidation and to minimize contact resistance of the electrical interconnecting parts.

The present invention is directed to providing an improved spring suspension system for a seismometer for overcoming the prior art problems.

SUMMARY

The present invention is directed to a spring suspension system for a seismometer for obtaining the maximum spring linearity consistant with good radial stability by providing three resilient leaf springs positioned between an inner and outer support ring with each spring including two adjacently positioned leaf arc elements radially displaced from each other and extending approximately 120° with the first end of the segments being connected to the inner and outer ring, respectively, and the second ends of the adjacent segments being connected together.

Yet a still further object of the present invention is the provision of an electrical spring suspension system having at least two separate electrical conducting paths through the spring subjecting the seismometer springs to excess rotational.

Still a further object of the present invention is to adequately protect the seismometer springs against certain externally applied rotational accelerations while avoiding the use of slip rings by providing a spiral electrical conducting spring connected to the seismometer spring which provides an electrical path and which allows a limited rotational movement of the suspended mass with respect to the frame.

Still a further object of the present invention is to facilitate the use of a one piece coil form, with its corresponding high mass to volume capability and/or ease of manufacture.

DESCRIPTION OF THE PREFERRED EMBODIMENTS

The spring suspension system of the present invention will be described, for purposes of illustration only, as used in a dual coil type seismometer of the class typically used in land geophysical exploration, but it is understood that the present invention is suitable for use in other types of seismometers.

Figure 1:
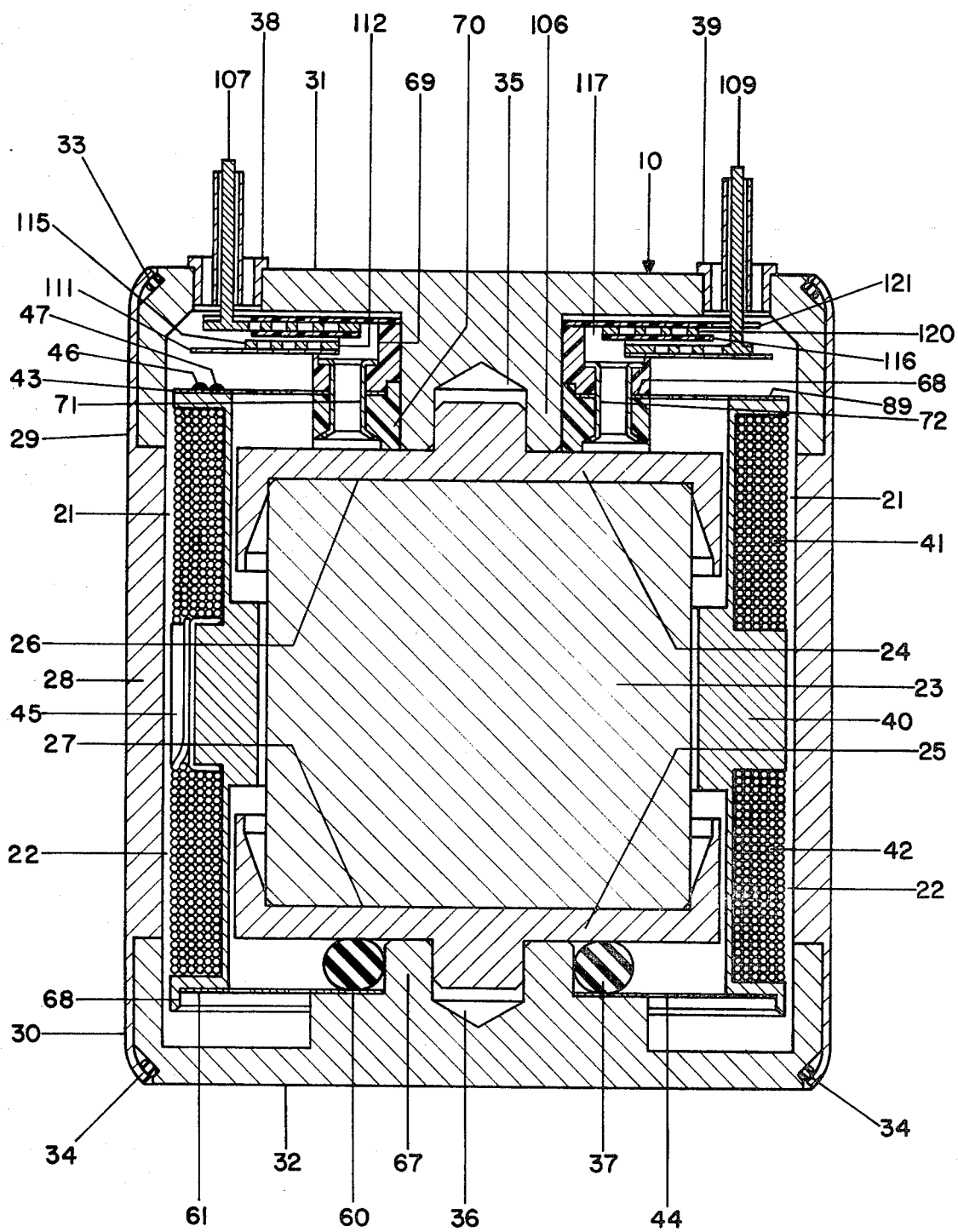
FIG. 1 is a cross section elevational view of an embodiment of a dual coil seismometer utilizing the present invention.

Referring now to FIG. 1, a dual coil seismometer, generally referred to as 10, includes air gaps 21 and 22 which are energized by a centrally positioned, cylindrical permanent magnet 23. This magnet is supported within the frame by two magnetic pole caps 24 and 25. Additionally, the pole caps serve to conduct magnetic lines of flux between a magnet pole face 26 and air gap 21, as well as between pole face 27 and air gap 22. The magnetic circuit is completed external to the air gaps by a cylindrical, magnetic, seismometer case, 28.

The top 31 and bottom caps 32 are made from a nonmagnetic material and are retained and sealed by swaged case ends onto O-rings 33 and 34. Holes 35 and 36 in the top 31 and bottom cap 32, respectively, retain concentrically the magnet and pole cap assembly 23, 24, and 25. O-ring 37 compensates for make up tolerances between the top and bottom cap and the case, and the top and bottom cap and the magnet assembly. Insulated terminals 38 and 39 located in the top cap 31, provide for external electrical connection.

A cylindrical, non-magnetic coil form 40, wound with two coils, 41 and 42, is suspended within the two air gaps 21 and 22, and other space provided, by a top spring 43 and a bottom spring 44. The two coils are connected in series along an axial slot 45 in the coil form. The remaining two coil wires are similarly brought up and connected to the top spring at 46 and 47.

Thus, in the present embodiment the case 28 and magnet 23 serves as a fixed reference support while the coils 41 and 42 serve as the inertia mass with the top spring 43 and the bottom spring 44 suspending the coils 41 and 42 relative to the magnet 23 so that relative vibrating acceleration forces cause movement of the coils 41 and 42 relative to the magnet 23 which induces a voltage signal in the coils.

Figure 3:
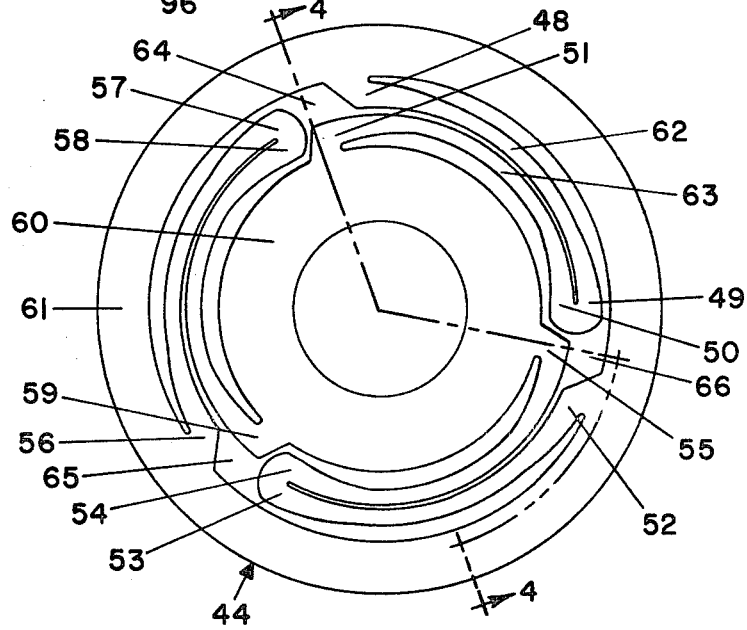
FIG. 3 is a plan view of a bottom leaf spring of the present invention.

Referring now to FIG. 3, which depicts the basic springs configuration of the present invention, which may be described as a uniform tri-flexure leaf spring 44. Spring 44 includes three resilient leaf springs each of which includes two adjacent arc like segments. The first spring includes two segments, the first of which is defined by flexure ends 48 and 49 and the second of which includes flexure ends 50 and 51. The second leaf spring includes two segments, one segment defined by flexure ends 52 and 53 and the second segment defined by flexure ends 54 and 55. The third leaf spring includes two segments, the first of which is defined by flexure ends 56 and 57 and the second of which is defined by flexure ends 58 and 59. All of the arc segments are circularly arranged in the same direction and are all intermediately positioned with respect to an inner support ring 60 and an outer support ring 61. Each pair of arc segments are radially displaced with each other, for example, segment 48–49 being radially displaced from segment 50–51. And each segment as well as both segments comprising a spring together subtend approximately 120° of arc of the spring. Accordingly, within a spring, the outer most segment will have two ends adjacent the two ends of the inner most segment, for example, referring to segment 48–49 and segment 50–51, end 49 is adjacent to end 50 and end 48 is adjacent to end 51. Also, end 49 and end 50 are joined one to the other, and the end 48 and end 51 are joined to the outer support ring 61 and the inner support ring 60, respectively. Thus, all of the arc segments are cantilevered and flex about the flexure ends 48–59.

Figure 2:
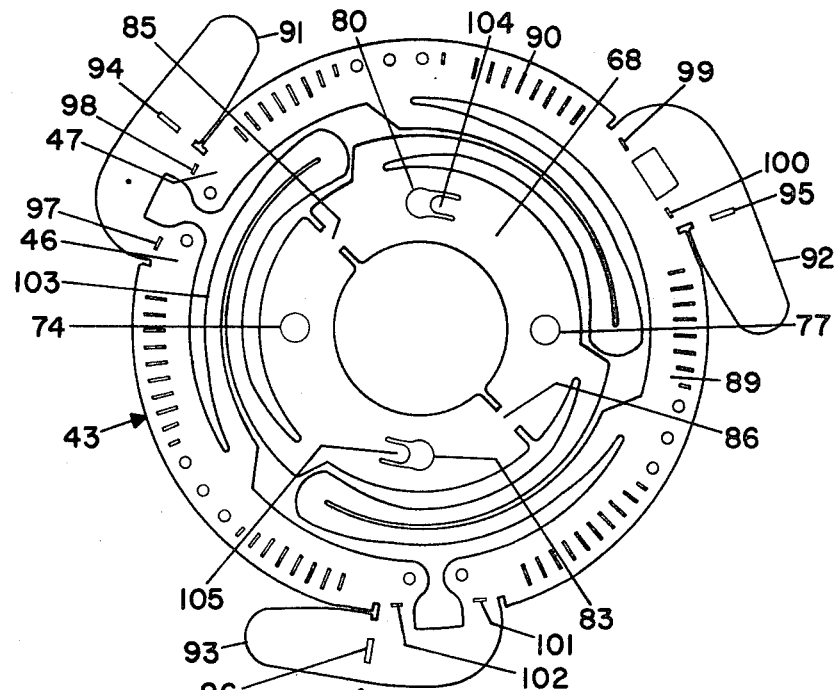
FIG. 2 is a plan view of a top leaf spring of the present invention, prior to assembly.
Figure 4:
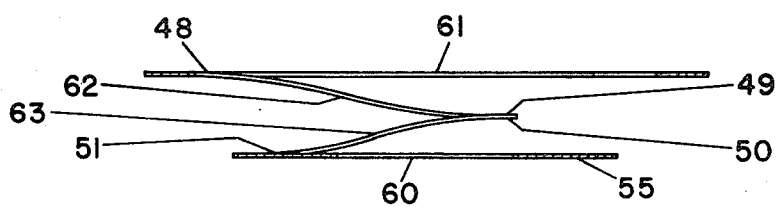
FIG. 4 is a sectional view of a portion of the bottom leaf spring of FIG. 3 delineated by lines 4—4 illustrating its free length configuration.

The leaf spring 44 of FIG. 3 as well as the leaf spring 43 of FIG. 2 is manufactured by the photo etch process from a thin sheet of non-magnetic spring material, such as beryllium copper alloy, with a thickness usually between 0.004 inch and 0.007 inch. The etched spring is then appropriately heat treated in a properly designed fixture to yield a spring whose free length condition is as depicted in FIG. 4. Such properly sized seismometer springs return to their flat condition when in equilibrium with their load. Referring to FIG. 1, spring 43 and spring 44 are two such springs supporting the seismometer coil assembly.

As previously stated, conventional seismometer springs embody three single segments. Referring to FIG. 3, a conventional seismometer spring can be illustrated by omitting the three innermost flexure segments 50–51, 54–55, and 58–59, and reconnecting the remaining flexure segments to the inner support ring by bridging 50 to 55, 54 to 59, and 58 to 51. (FIG. 4 would now reflect the omission of flexure segment 50–51 and the bridging of 50 to 55.)

Now if the outer support ring 61 of a conventional spring were fixed in a plane, and the inner support ring 60 caused to be displaced axially with respect to that plane, it should be evident that a slight counterclockwise movement of the inner support ring 60 must accompany either an upward or a downward displacement of the inner support ring from that plane. This is, of course, due to the fact that the projected image of the flexure to the plane of the outer support ring 61 becomes shorter as the inner support ring 60 is displaced farther from the flat position. It should also be appreciated that although the same must be said regarding the projected image of flexure segments of the present invention, two such actions are caused to oppose one another. Therefore the spring 44 of FIG. 3, and of the present invention, can be described as being rotation cancelling.

A comparison of performance of the springs of the present invention as depicted in FIG. 3 to that of the conventional spring of the prior art will now be made. Since both the present and the conventional spring are three flexure springs, the comparison will be made on the basis of one segment, with the inside diameter of the outer support ring 61 being the same in both cases. Also rectangular flexure segments will be assumed.

Of a single leaf cantilever spring with such a section it can be written:

$$d = (2L^2S)/(3Et)$$

where
 $d$ = Displacement
 $L$ = Length of cantilever
 $S$ = Tensile or compressive stress
 $E$ = Modulus of Elasticity
 $t$ = Thickness of cantilever Now the length of the flexure segments 48–49 and 50–51 of the present spring are equal and in a typical application measure 0.580 inch each. Also the segments 48–49 and 50–51 are comprised of four cantilever sections 48–62, 62–49, 50–63, 63–51 joined end to end with fixed cantilever ends being located 48, 49, 50, and 51, and free cantilever ends being joined at 62 and 63. Therefore, each spring consists of four cantilever sections, end to end, each cantilever being 0.580/2, and $$d_2 = [(4) \, 2 \, (0.580/2)^2 \, S_2]/3 \, E_2 \, t_2$$

where $d_2$ = displacement of present spring.

Similarly, a segment of a prior art spring can be shown to consist of two cantilever sections joined end to end. Since equal segment length is not a consideration, the flexure segment length of the conventional spring is somewhat longer, making use of the space comparable to 64 of FIG. 3. Therefore, the flexure segment length of a conventional equivalent is 0.670 inch, each cantilever section being 0.670/2, and :

$$d_1 = [(2) \; 2 \; (0.670/2)^2 \; S_1]/3 \; E_1 \; t_1$$

where $d_1$ = displacement of conventional spring

Now comparing $d_2$ to $d_1$:

$$\frac{d_2}{d_1} = \frac{\frac{(4)2\left(\frac{.580}{2}\right)^2 S_2}{3E_2 t_2}}{\frac{(2)2\left(\frac{.670}{2}\right)^2 S_1}{3E_1 t_1}}$$

Let $S_2 = S_1$, $E_2 = E_1$, $t_2 = t_1$ $$d_2/d_1 = [2 \; (0.580/2)^2]/[(0.670/2)^2] = 1.51$$

Therefore it can be stated that the present spring of FIG. 3 basically has a linear range of approximately 150 percent that of the conventional seismometer spring. Additionally, it should be clear that a somewhat greater improvement in displacement may be obtained by increasing the length of the outermost flexure segments so as to make use of spaces 64, 65, and 66, thereby accepting only partial rotational cancelling. In either case, the basic linearity will be greater than, and the rotational effects less than those of the conventional seismometer spring.

It should however also be appreciated, that while the basic linearity of the improved spring of the present invention is increased, lateral stability and strength are to a great extent maintained. Three flexures joined to the inner and outer support rings at 120° intervals causes the spring to exhibit near uniform radial stiffness characteristics.

Referring to FIG. 1, the bottom leaf spring 44, is that spring depicted in FIG. 3. An inner support ring 60, of the bottom spring 44 is a slip fit over a bottom central boss 67 of the bottom cap. Also the outer support ring 61, of the bottom spring 44 is a slip fit into a spring recess 68 of the coil form 40, being maintained in its position by the normal tension of the bottom spring 44. In such a suspension system, where the bottom spring 44 is disassociated from electrical interconnects, it is practical to adjust the natural frequency to close tolerances by individually selecting a bottom spring of the required thickness. Access to the bottom spring is obtained before swaging case end 29 by inverting the seismometer and lifting case 28, bottom cap 32, O-ring 34, bottom spring 44, and O-ring 37 from the remaining components of the seismometer. Removal of O-ring 37 then allows replacement of spring 44. Reassembly is performed by the reverse procedure.

The basic spring configuration of the top spring 43 of FIG. 1 is identical to that of the previously described FIG. 3. Additionally, the top spring functions as the two electrical interconnects to the coil, and is therefore arranged to form two separate electrically conducting paths between its corresponding inner and outer support rings. Accordingly, the inner support ring and the outer support ring of the top spring are separated after being assembled into their predetermined fixed positions. The top spring, prior to assembly, is depicted in FIG. 2.

Figure 5:
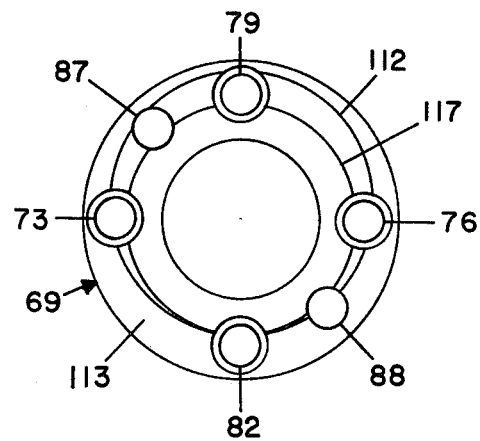
FIG. 5 is a plan view of an upper spring hub.
Figure 6:
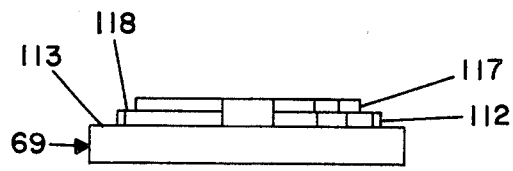
FIG. 6 is an end view of the upper spring hub of FIG. 5.
Figure 7:
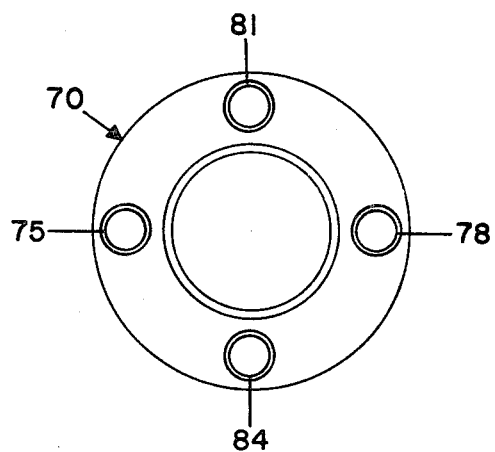
FIG. 7 is a plan view of a lower spring hub.

Referring to FIG. 1, an inner support ring 68 (also in FIG. 2) is held in position between an upper spring hub 69 (also FIG. 5 and FIG. 6) and a lower spring hub 70 (also FIG. 7) by four eyelets. Eyelets 71 and 72 are two of the eyelets which are in view. Eyelet 71 passes through hole 73 of hub 69 (FIG. 5), hole 74 of spring 43 (FIG. 2), and hole 75 of hub 70 (FIG. 7), eyelet 72 passes through holes 76 of hub 69, 77 of spring 43, and 78 of hub 70. In like manner, the remaining two eyelets pass through holes 79, 80, and 81, and through holes 82, 83, and 84. The inner support ring 68, being fixed in this manner by four flaired eyelets, is separated by removing bridges 85 and 86 of FIG. 2. One method of separating the inner support ring is by drilling into each bridge through drill guide holes 87 and 88 of the upper spring hub 69.

The upper and lower spring hubs 69 and 70 are composed of an electrically insulating material. These spring hubs are economically manufactured to close tolerances by an injection molding process. Various commercially available thermoset molding compounds are suitable for this application.

Referring again to FIG. 1, the outer support ring 89 (also in FIG. 2) 40. Appropriate fillers in the adhesive space the spring and the coil form a small amount, causing the joint to be electrically insulating. The coil form is prepared for the adhesive by etching to a dull finish.

Referring again to FIG. 2, the radial slots in the outer support ring, such as slot 90, provide additional interlocking means for the adhesive. Alignment tabs 91, 92, and 93 are bent downward approximately 30° from the plane of the spring, at perforations 94, 95, and 96, respectively. These tabs accurately center the top spring 43 to the coil form 40. Subsequent to the bonding process, the three alignment tabs 91, 92 and 93 are removed, and the outer support ring 89 of the top spring is separated by breaking off along the lines formed by perforations 97–98, 99–100, and 101–102. In this manner the coil wire soldered at 46 is electrically connected through a flexure spring 103 by the eyelet in hole 83, and the coil wire soldered at 47 is electrically connected through the remaining two flexure springs to the eyelet in hole 80. The small tabs 104 and 105 associated with eyelet holes 80 and 83, spring against their respective eyelets with a sharp edge, insuring positive electrical connection.

Figure 8:
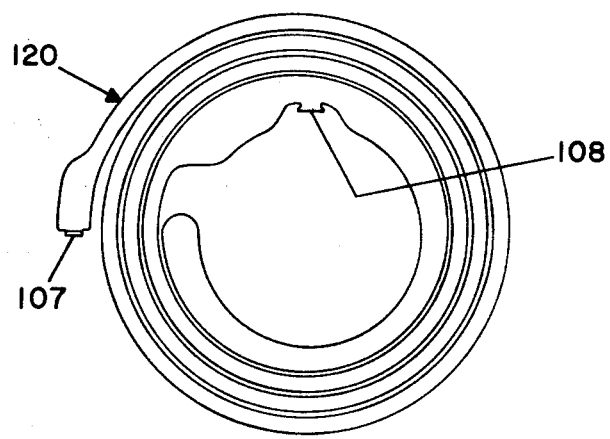
FIG. 8 is a plan view of an upper spiral interconnect of the present invention.
Figure 9:
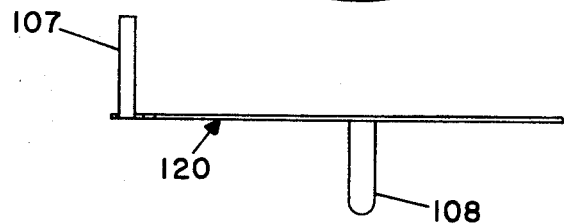
FIG. 9 is an end view of the upper spiral interconnect of FIG. 8.
Figure 10:
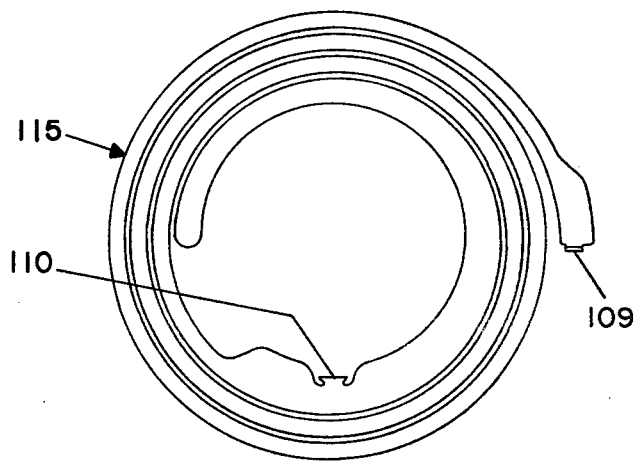
FIG. 10 is a plan view of a lower spiral interconnect of the present invention.
Figure 11:
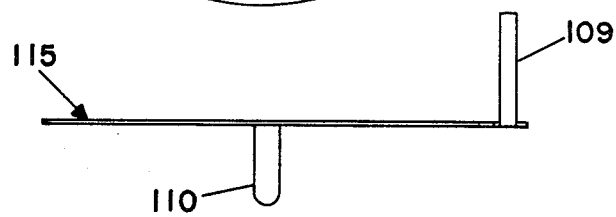
FIG. 11 is an end view of the lower spiral interconnect of FIG. 10.

The spiral interconnections 120 and 115 of FIG. 8 and FIG. 10, in conjunction with the separated top spring, provided an improved method of electrically interconnecting the seismometer terminals to the coils 41 and 42, while protecting seismometer spring 43 from excess externally applied rotational accelerations. The outside ends 107 and 109 of the spiral interconnects 120 and 115 are fixed to terminals 38 and 39 in the case top; the inside ends 108 and 110 of the spiral interconnects 120 and 115 are fixed to eyelets of the spring hubs. With the spring hubs being of a slip fit over the top central boss, 106 of FIG. 1, the coil form 40 is allowed to rotate slightly more than 90° in either direction from its central position before completely winding up one or the other of the spiral interconnects 120 or 115. Under zero torque conditions, the spiral interconnects 120 or 115, acting as spiral springs, return the coil form 40 approximately to its central angular rest position. Sufficient rotational damping is obtained from the normal friction between the parts involved. Additionally, the spiral interconnects 120 and 115 are dimentioned so as to produce somewhat less than the yield stress within the top spring at the angle of maximum rotation. Such a system of controlled rotation takes advantage of the fact that the damaging rotational accelerations typically encountered in use are of a transient nature, and operate over relatively small angles. Thus, the spiral interconnects 120 and 115 operate to substantially reduce the transient peak rotational acceleration transmitted to the coil form 40, thereby reducing peak stresses within the seismometer springs 43 and 44.

Spiral interconnects 120 and 115, FIGS. 8, 9, 10, and 11, are economically manufactured from beryllium copper sheet with a thickness of 0.015 to 0.018 by the photoetch process. Three quarter hard material for this application is sufficiently strong, and allows for the bending of tabs 107 and 108 of FIG. 9, and 109 and 110 of FIG. 11. No heat treatment is required.

Figure 12:
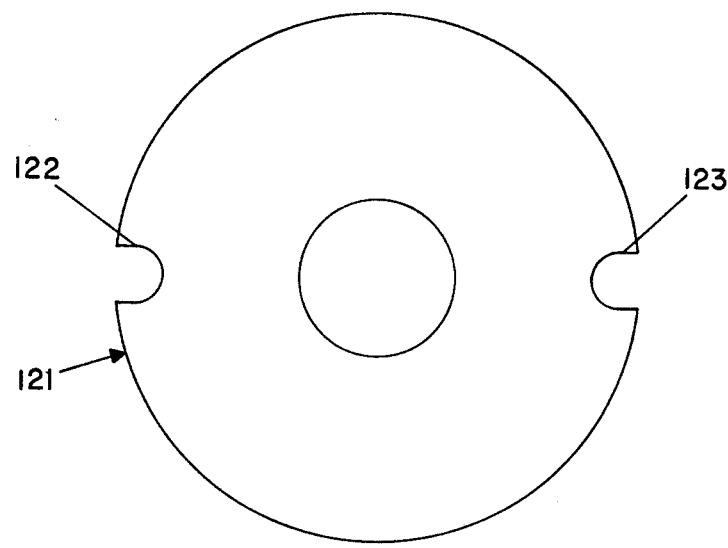
FIG. 12 is a plan view of a top disc insulator.
Figure 13:
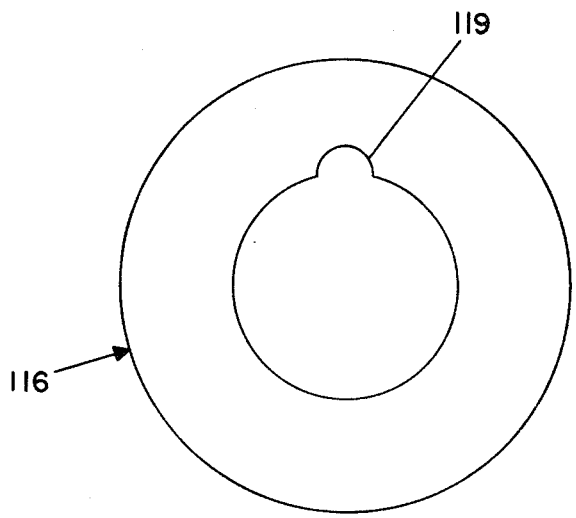
FIG. 13 is a plan view of a separator disc insulator.
Figure 14:
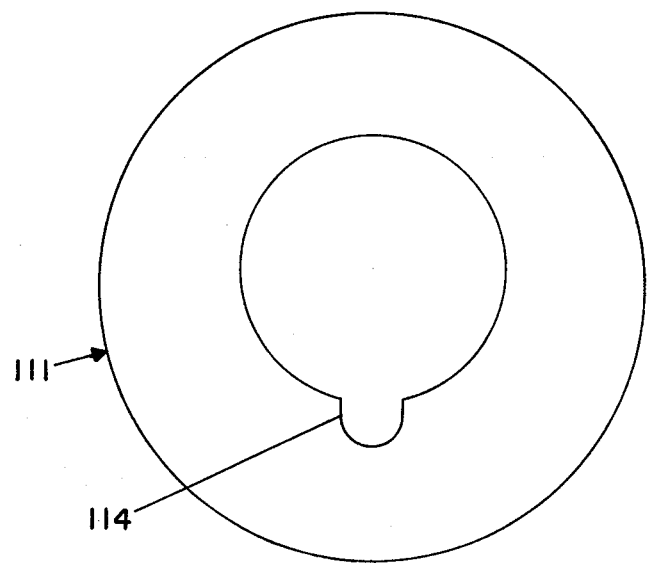
FIG. 14 is a plan view of a retainer disc.

Referring to FIG. 1, the spiral interconnects 120 and 115 are assembled to the upper spring hub 69 (also FIGS. 5 and 6) as follows: Retainer disc 111 (also FIG. 14) is a slip fit over eccentric 112 (also FIGS. 5 and 6) and rests against step 113 of FIGS. 5 and 6. The retainer disc is a 0.006 thick beryllium copper disc. The retainer disc contains the spiral interconnects between it and top cap 31. Notch 114 of FIG. 14 aligns with hole 82 of FIG. 5. Lower spiral interconnect 115 is a slip fit over eccentric 112 with tab 110 of FIG. 11 protruding into the hollow eyelet of hole 82 of FIG. 5, where it is attached by soldering. The separator disc insulator 116 (also FIG. 13) a punched disc of 0.0075 polyester, is a slip fit over diameter 117 (also of FIGS. 5 and 6) resting on step 118 of hub 69, with notch 119 of insulator 116 aligned with hole 79 of hub 69. Upper spiral interconnect 120 is a slip fit over diameter 117 of hub 69 with tab 108 of interconnect 120 protruding into the hollow eyelet of hole 79 of hub 69 where it is attached by soldering. Top disc insulator 121, (also FIG. 12), a punched disc of 0.0075 polyester, is a slip fit over top central boss 106, with notches 122 and 123 of insulator 121 in alignment with terminals 38 and 39. Accordingly, tabs 107 and 109 pass through terminals 38 and 39, where they are soldered.

Therefore, as previously described, the coil wires terminated at 46 and 47 are electrically connected to terminals 39 and 38 through two separate insulated parts of the top spring 43, two eyelets, and two separate, insulated, spiral interconnects 120 and 115. Paths of connection are: (1) wire termination 46 through the eyelet in holes 83 of spring 43 and 82 of hub 69, through the lower spiral interconnect 115, to tab 109 in terminal 39; (2) wire termination 47 through the eyelet in holes 80 of spring 43 and 79 of hub 69, through the upper spiral interconnect 120, to tab 107 in terminal 38.

The present invention is therefore well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A spring suspension system for a seismometer for suspending one body relative to a second body comprising,
an inner support ring connected to one of the bodies,
an outer support ring positioned coaxially with the inner ring and connected to the second body,
three resilient leaf springs being positioned between the rings,
each spring including first and second adjacently positioned arc leaf segments radially displaced from each other and extending approximately 120°, the first segment being adjacent the inner ring and the second segment being adjacent the outer ring, each segment having first and second ends, the first ends of the first and second segments being adjacent to each other, the second ends of the first and second segments being adjacent to each other, said second ends of the first and second segments being connected together, the first end of the first segment being connected to the inner ring and the first end of the second segment being connected to the outer ring.

2. The apparatus of claim 1 wherein the inner and outer rings include portions electrically insulated from each other for providing at least two separate electrically conducting paths through the inner and outer rings.

3. The apparatus of claim 1 including,
a plurality of removable alignment tabs connected to the outer ring for aligning the outer ring with the second body for bonding therewith and afterwards for removal.

4. The apparatus of claim 2 including,
a spiral electrically conducting spring connected to each separate electrical path, one end of which is fixed and the second end limiting rotational movement of said leaf springs.

5. In a spring suspension system for a seismometer for suspending one body relative to a second body by a spring including portions electrically insulated from each other for providing at least two separate electrically conducting paths through the spring, the improvement comprising,
a spiral electrically conducting spring connected to each separate electrical path in said spring, one end of the spiral spring being fixed and the second end connected to and limiting rotational movement of the suspension spring.

6. A spring suspension system for a seismometer for suspending a coil relative to a frame comprising,
an inner support ring connected to the frame,
an outer support ring positioned coaxially with the inner ring and connected to and supporting the coil,
three resilient cantilevered leaf springs being positioned between the rings, all of which circularly extend in the same rotational direction,
each spring including first and second adjacent arc segments radially displaced from each other and each extending approximately 120°, the first segment being adjacent the inner ring and the second segment being adjacent the outer ring, each segment having first and second ends, the second ends of the first and second segments being connected together, the first end of the first segment being connected to the inner ring, and the first end of the second segment being connected to the outer ring.

7. The apparatus of claim 6 wherein the inner and outer rings each include portions electrically insulated from each other for providing at least two separate electrically conducting paths through the inner and outer rings.

8. The apparatus of claim 7 including,
a spiral electrically conducting spring connected to each separate electrical path, one end of said spring being fixed and the second end limiting rotational movement of said leaf springs.

9. A spring suspension system for a seismometer for suspending one body relative to a second body comprising, an inner support ring connected to one of the bodies,
an outer support ring positioned coaxially with the inner ring and connected to the second body,
three resilient leaf springs being positioned between the rings,
said inner and outer rings including portions electrically insulated from each other for providing at least two separate electrically conducting paths through the inner and outer rings.

* * * * *